Oct. 1, 1963

D. L. ANDERSON ETAL 3,105,345

TREE SHAKER

Filed Dec. 22, 1961

INVENTORS
DEWEY L. ANDERSON
WAYNE H. WOODS

BY *Gardner J. O'Boyle*

ATTORNEY

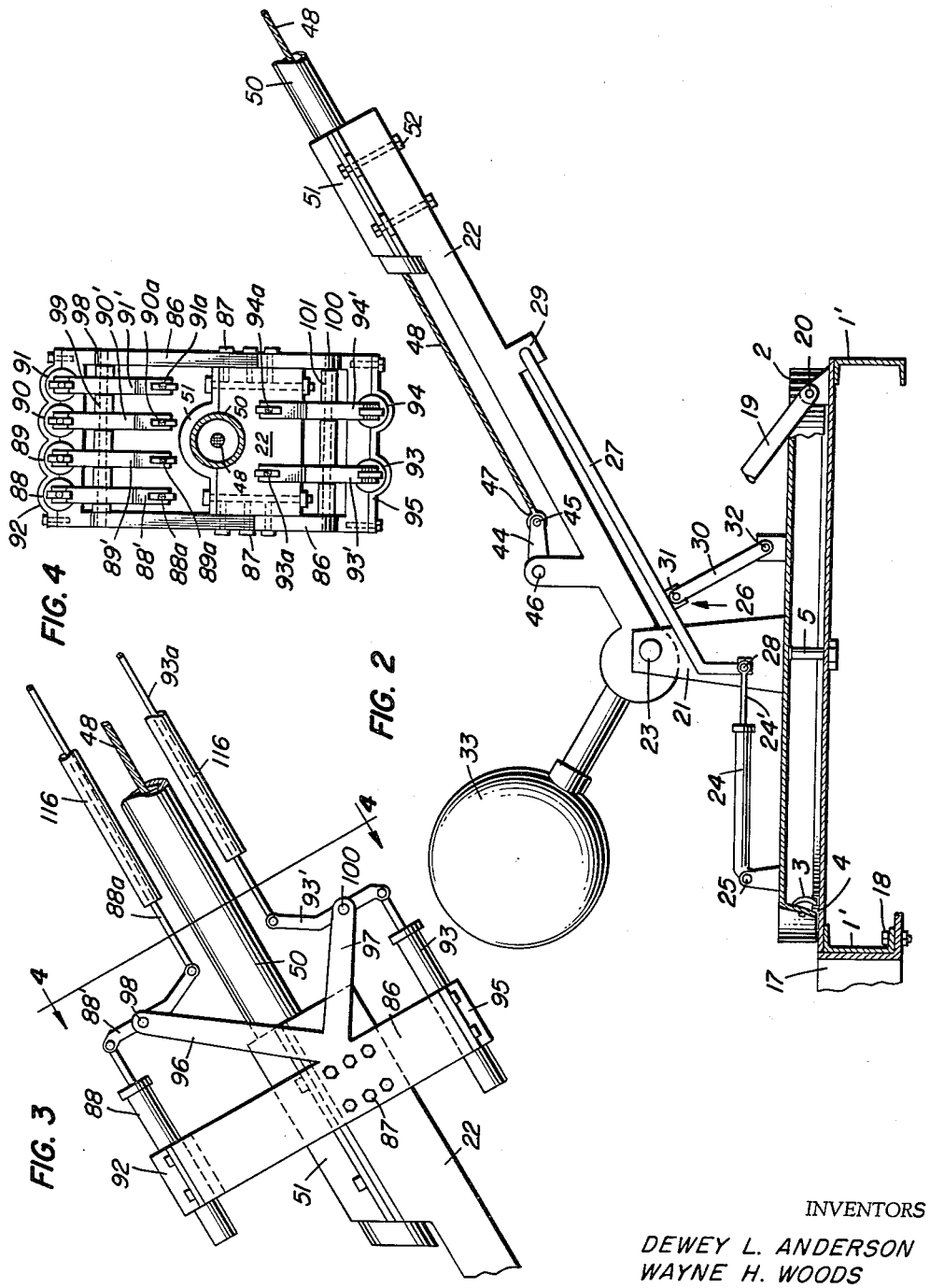

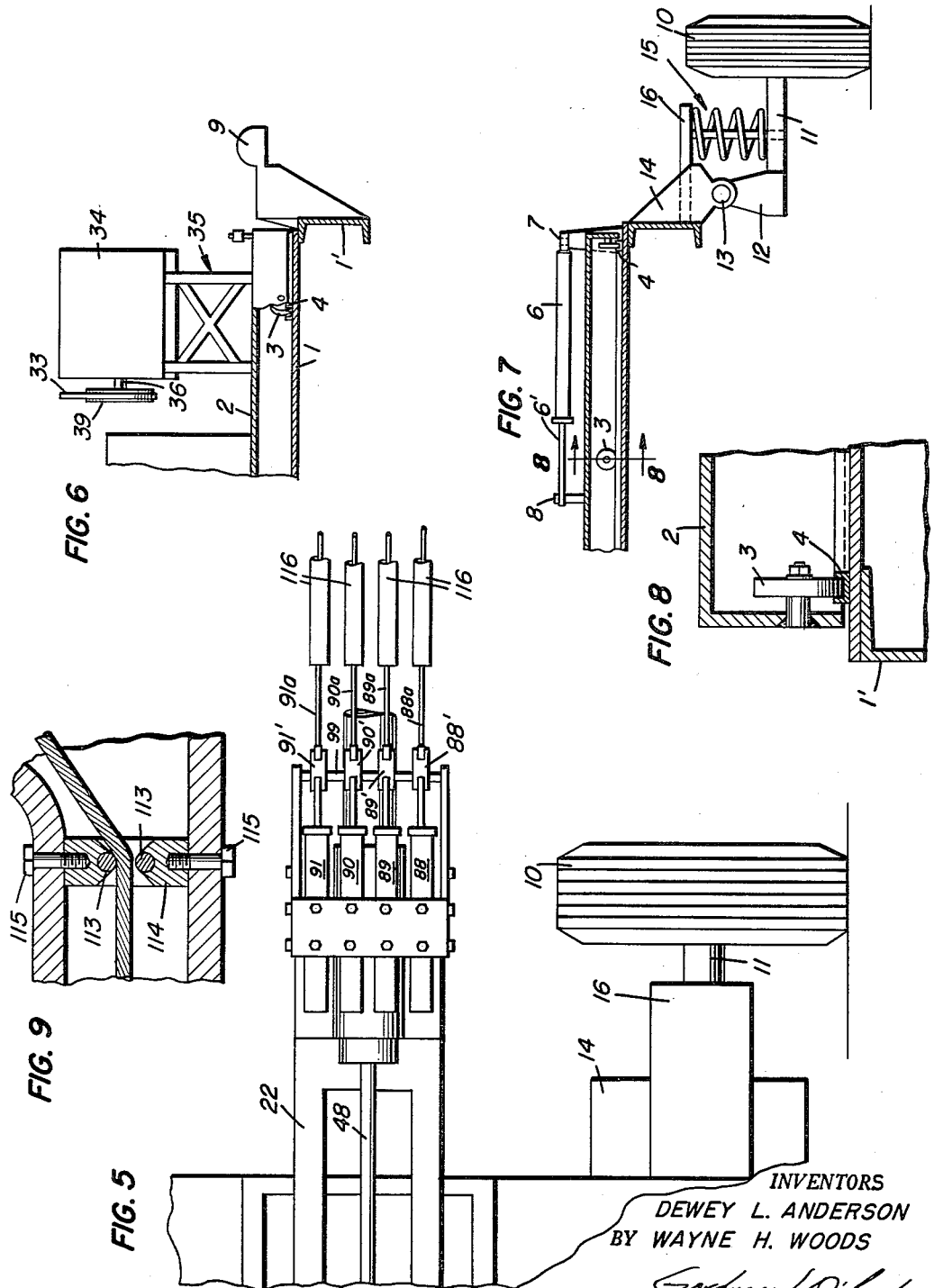

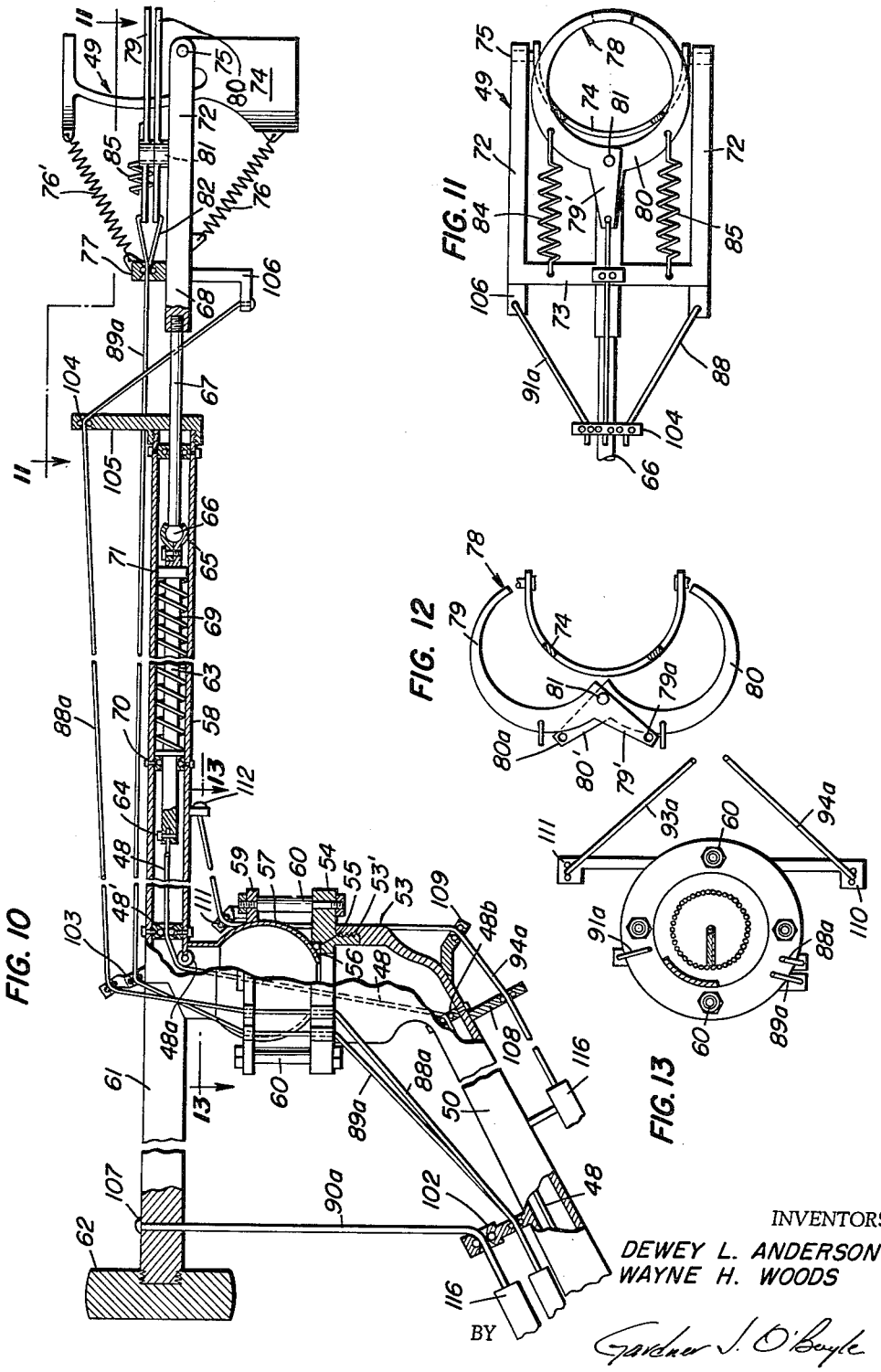

Oct. 1, 1963   D. L. ANDERSON ETAL   3,105,345
TREE SHAKER
Filed Dec. 22, 1961   5 Sheets-Sheet 5
FIG. 14
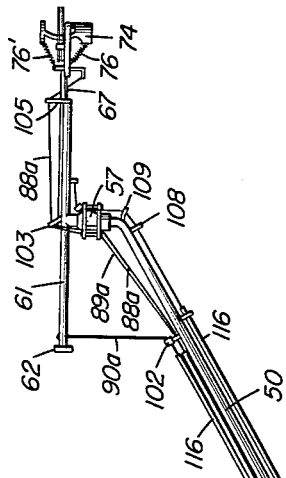
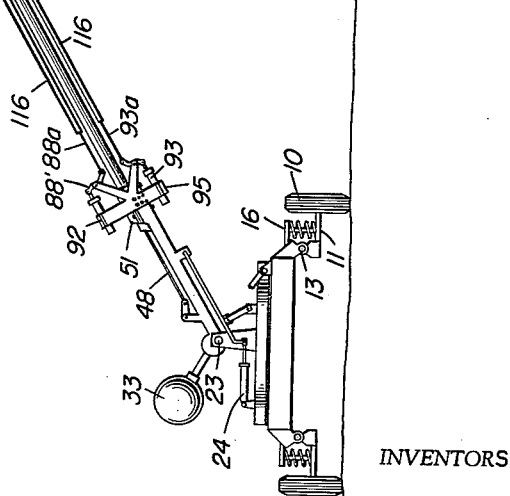
INVENTORS
DEWEY L. ANDERSON
WAYNE H. WOODS
BY Gardner J. O'Boyle
ATTORNEY

United States Patent Office 3,105,345
Patented Oct. 1, 1963

3,105,345
TREE SHAKER
Dewey L. Anderson, 1503 Forsyth Ave., and Wayne H. Woods, 1004 Speed St., both of Monroe, La.
Filed Dec. 22, 1961, Ser. No. 161,713
8 Claims. (Cl. 56—328)

This invention relates to tree-shaking machines, and more particularly to a machine for shaking the limbs of a nut tree to remove nuts therefrom.

An object of the invention is to provide an improved machine for shaking nuts from a tree.

Yet another object of our invention is to provide an improved mobile tree-shaking machine adapted to shake pecan nuts from a tree incident to the harvesting of the nuts.

Still another object of our invention is to provide an improved, comparatively lightweight tree-shaking machine adapted to be mounted on the side of a vehicle.

A further object of our invention is to provide an improved tree-shaking machine wherein a shaker head assembly is operatively connected to a boom through a hollow arm, said boom and hollow arm being adapted to rotate in horizontal planes and to pivot in vertical planes, said shaker head assembly being adapted to tilt about the longitudinal axis of the hollow arm.

A still further object of our invention is to provide an improved tree-shaking machine wherein the boom and shaker assembly are independently actuated by a plurality of fluid motors.

Another object of our invention is to provide an improved tree-shaking assembly including a shaker head having clamping means adapted to encircle the trunk of a tree while the tree is being shaken.

With these and other objects in view, which may be incident to our improvements, the invention consists in the parts and combinations to be hereinafter set forth and claimed, with the understanding that the several necessary elements comprising our invention, may be varied in construction, proportions and arrangements, without departing from the spirit and scope of the appended claims.

In order to make our invention more clearly understood, we have shown in the accompanying drawings means for carrying the same into practical effect, without limiting the improvements in their useful application to the particular constructions which, for the purpose of explanation, have been made the subject of illustration.

In the drawings:

FIG. 2 is a reduced fragmentary view, partially in section, taken along line 2—2 of FIG. 1, showing the turntable secured to the side of a vehicle;

FIG. 3 is a side view of the shaker boom, showing a bank of fluid motors mounted thereon;

FIG. 4 is a sectional view taken along line 4—4 of FIG. 3;

FIG. 5 is a top plan view of the shaker boom, showing the fluid motors secured thereto;

FIG. 6 is a sectional view taken along line 6—6 of FIG. 1;

FIG. 7 is a sectional view taken along line 7—7 of FIG. 1;

FIG. 8 is an enlarged sectional view taken along line 8—8 of FIG. 7;

FIG. 9 is a detail view of an anti-friction means for guiding cables in the shaker head assembly;

FIG. 10 is a side view, partially in section, showing the shaker assembly connected to the upper end of the boom;

FIG. 11 is a view taken along line 11—11 of FIG. 10, showing the shaker head assembly and associated clamping means;

FIG. 12 is a top plan view of a portion of the shaker head assembly, showing the clamping means in the open position;

FIG. 13 is a sectional view taken along line 13—13 of FIG. 10; and

FIG. 14 is a side elevational view showing the composite tree shaker.

Figure 1:
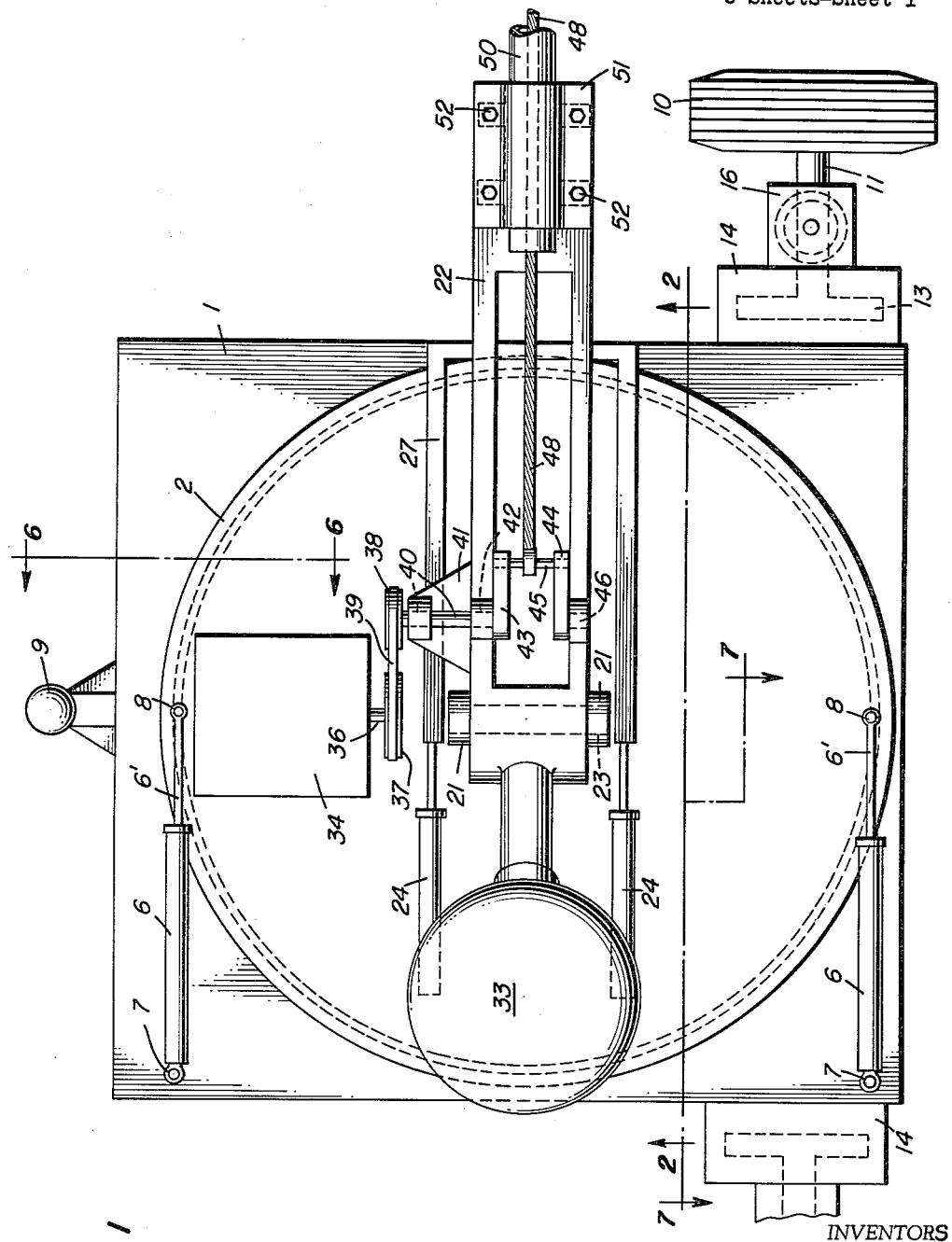
FIGURE 1 is a top plan view of the turntable and shaker head actuating means mounted on a trailer assembly.

Referring to the drawings, and more particularly to FIGS. 1, 2, 6 to 8, and 10 thereof, the tree-shaking machine comprises a base 1 having side frames 1', a turntable 2 rotatably supported on the base by means of a plurality of rollers 3 carried by the table, said rollers being adapted to roll in a trackway 4 secured to the base. The turntable is adapted to be oscillated about an axis 5 by means of a pair of fluid motors 6, each of the motors having its cylinder end connected to the base as at 7, and the outer end of its piston rod 6' connected to the turntable at 8, as shown in FIG. 1.

As will be seen in FIGS. 1, and 5 to 7, the base 1, together with its associated turntable 2, is adapted to be transported as a trailer. For this purpose the forward end of the base is provided with a trailer hitch 9, and at each side of the rear portion of the base a wheel 10 (FIG. 7) is rotatably mounted on an axle 11 supported on the side frame 1' by means of a bracket 12 having one end secured to the axle, the opposite end of said bracket being pivotally connected at 13 to a bracket 14 secured to the frame 1' of the base. The base is resiliently supported on the axle 11 by means of a spring suspension 15 mounted between the axle and an arm 16 carried by the side frame 1'.

If desired, the base 1 can be mounted on the side of a vehicle, such as a tractor, truck, or the like. In the modification shown in FIG. 2, the inboard side of the base is secured to a side frame 17 of a vehicle, by bolt means 18, or other suitable securing means, the outboard side of the base having a brace 19 pivotally connected thereto as at 20, the opposite end of the brace being attached to the side of the vehicle, not shown.

Referring to FIGS. 1 and 2, the turntable 2 is provided with a pair of arms 21 on which a boom 22 is pivotally supported as at 23, said boom being adapted to be raised and lowered by means of a pair of fluid motors 24, each of said motors having its cylinder end pivotally connected at 25 to the turntable and having the end of its piston end 24' connected to the boom through a suitable linkage 26, said linkage comprising a lever 27 (FIG. 2) having one end pivotally connected to the piston rod 24' at 28, the opposite end being journaled in the boom at 29, and a link 30 pivotally connected to the lever 27 at 31 and to the turntable 2 at 32, said boom also being provided with a counterweight 33 for balancing the weight of the boom as it is raised and lowered about pivot 23. An internal combustion engine 34 is supported on the turntable 2 through suitable frame member 35 (FIG. 6), said engine having an output shaft 36 and a drive pulley 37 secured thereto, said drive pulley being connected to a driven pulley 38 through a belt 39, the driven pulley being connected to one end of a shaft 40 journaled at 40' in a support bracket 41 secured to the boom, the opposite end of the shaft 40 being journaled in the boom 22 at 42 and connected to a crank arm 43, said crank arm being connected to crank arm 44 by means of a wrist-pin 45, the crank arm 44 being journaled in the boom at 46, said wrist-pin 45 having a collar 47 journaled thereon to which is secured a cable 48 for actuating a shaker head assembly 49 (FIG. 10) to be described more fully hereinafter. From the above description, it will be seen that the internal combustion engine 34 imparts rotary motion to the crank arms 43 and 44 which is translated into reciprocatory motion for actuation of the shaker head assembly 49 through the cable 48.

Referring to FIGS. 1, 2 and 10, a tube 50, formed from aluminum, or other lightweight metal, is mounted at one end thereof on the outer end portion on the boom 22 by means of a clamping plate 51 secured to the boom by bolt means 52, the opposite end of the tube (FIG. 10) terminating in a bell-shaped portion 53 having internal threads 53′ for threadably securing a collar 54 thereto. The collar 54 is provided with a shoulder 55, forming a seat for a plurality of ball bearings 56 interposed between the collar and a hollow spherical member 57 rigidly secured to a hollow arm 58, said spherical member being held in a seated position on the ball bearings by means of a second collar 59 surrounding the spherical member, and connected to the collar 54 by means of tie-rods 60. Through this construction and arrangement, it will be noted that a universal joint is established between the tube 50 and the hollow arm 58, said arm having a solid portion 61, to which there is secured a counterweight 62, for balancing the arm as it pivots about the universal joint.

As will be seen in FIG. 10, the hollow arm 58 is provided with a drawbar 63 having one end connected to cable 48, as at 64, said cable being reeved through anti-friction means 48′ and a roller 48a mounted within the arm 58, and through anti-friction means 48b mounted within the tube 50, the opposite end of the drawbar being provided with a socket 65 adapted to receive the spherical shaped end portion 66 of a rod 67, said rod having its opposite end threadably secured to a frame member 68 of the shaker head assembly 49. It will thus be seen that by means of the ball and socket connection 65, 66, the shaker head assembly is adapted to tilt about the longitudinal axis of the arm 58. A coil spring 69 surrounding the drawbar 63, is positioned between an anti-friction means 70 secured to the arm 58, and a washer 71 secured to the drawbar whereby, when a pull is exerted on the cable 48, the drawbar 62 moves to the left, as viewed in FIG. 10, thereby compressing the spring 69, and upon release of the cable 48, the spring expands, thus moving the drawbar to the right.

As will be seen in FIGS. 10–12, the shaker head assembly 49 comprises a pair of parallel arms 72 connected together at one end by a transverse arm 73 secured to the frame member 68, said parallel arms having a rubber coated limb shaker head 74 pivotally secured thereto as at 75, spring means 76 interposed between the lower portion of the shaker head 74 and the frame member 68, and spring means 76′ between the upper portion of the shaker head 74 and an anti-friction means 77 mounted on the transverse arm 73. It will thus be seen that the shaker head 74 can tilt about its pivotal points 75, in order that it may conform with the angle of inclination of the limb to be shaken, and that the spring means 76 and 76′ return the shaker head 74 to its initial position (FIG. 10) when the shaker head is removed from the limb.

The shaker head assembly 49 also includes a rubber coated limb clasping unit designated generally by numeral 78, said clasping unit comprising a pair of overlapping semi-circular members 79 and 80 pivoted to each other as at 81, and supported on the frame member 68. The semi-circular members 79 and 80 are provided with arms 79′ and 80′, respectively, having apertures 79a and 80a formed therein, to accommodate a split end 82 of a cable 89a, one branch of the split end being secured in the aperture 79a and the other branch being secured in the aperture 80a, whereby the circular members 79 and 80 may be pivoted, as will be described. Spring means 84 and 85 are also provided between each semi-circular member 79 and 80 and the transverse arm 73 for biasing the clasping unit 78 into its open position as shown in FIG. 12. Accordingly, by means of the above described arrangement, when a pull is exerted on the cable 89a, the semi-circular members 79 and 80 move about the pivot 81 in a scissor-like action to close the clasping unit 78 and, simultaneously, place the spring means 84 and 85 under tension, as shown in FIG. 11.

Among the important features of the present invention is the novel arrangement by which the hollow arm 58 can be rotated in a horizontal plane and pivoted in a vertical plane, and the arrangement for tilting the shaker head assembly 49 about the longitudinal axis of the hollow arm. Referring to FIGS. 3 and 4, a frame 86 of rectangular cross section is secured to the boom 22 by bolts 87, or other suitable fastening means, the upper portion of the frame being provided with a plurality of recesses to accommodate four fluid motors 88, 89, 90 and 91 secured therein by means of a clamping plate 92, the lower portion of the frame also being recessed to accommodate two fluid motors 93 and 94 secured therein by means of a clamping plate 95. Each side of the frame 86 is provided with a pair of diverging arms 96 and 97, the arms 96 having a shaft 98 extending therebetween on which a plurality of spacers 99 (FIG. 4) are mounted, and the arms 97 having a shaft 100 extending therebetween on which a plurality of spacers 101 are mounted. The shaft 98 is provided with four levers 88′, 89′, 90′ and 91′ journaled thereon between the spacers 99, the shaft 100 having two levers 93′ and 94′ journaled thereon between the spacers 101.

Each of the levers 88′, 89′, 90′, 91′, 93′ and 94′ has one end pivotally connected to the fluid motors 88, 89, 90, 91, 93 and 94, respectively, and the opposite end of each lever being pivotally connected to one end of cables 88a, 89a, 90a, 91a, 93a and 94a, respectively. The opposite ends of cables 88a and 91a are reeved through anti-friction means 102 mounted on the tube 50 (FIG. 10), upwardly through collars 54 and 59, through anti-friction means 103 mounted on the hollow arm 58, outwardly through anti-friction means 104 supported on the end of an upwardly extending bracket 105 threadably secured to the end of the hollow arm 58, and then secured to a pair of depending brackets 106 carried by the arms 72. The opposite end of cable 89a is reeved through anti-friction means 102, collars 54 and 59, anti-friction means 103 and 77, and secured to the clasping unit 78 as described hereinabove. The opposite end of cable 90a is reeved through anti-friction means 102 and secured as at 107 to the solid portion 61 of the hollow arm 58. The opposite ends of cables 93a and 94a are reeved through anti-friction means 108 and 109 secured to the tube 50, through anti-friction means 110 and 111, respectively, secured to the collar 59, and then attached to the hollow arm as at 112. From the above description it will be readily seen that fluid motor 90 and cable 90a control the movement of the hollow arm 58 in a vertical plane, fluid motors 93 and 94 and cables 93a and 94a control the movement of the arm in a horizontal plane, fluid motors 88 and 91 and cables 88a and 91a control the tilting of the shaker head assembly 49, and fluid motor 89 and cable 89a control the actuation of the clasping unit 78.

As referred to hereinabove, anti-friction means are employed in various locations on the tree-shaking machine to facilitate movement of the actuating cables. A typical anti-friction member is illustrated in FIG. 9 wherein ball bearings 113 are mounted within a race 114, said race being secured in a desired position by bolts 115 or other suitable fastening means. If desired, a plurality of aluminum or other lightweight metal tubes 116 can be mounted on the tube 50, through which tubes the various actuating cables may extend, thereby preventing the cables from becoming entangled or otherwise damaged.

In operation, the harvesting machine is adapted to be trailed, as shown in FIG. 1, or adapted to be mounted on the side of a vehicle, as shown in FIG. 2. When the harvesting machine is positioned near a tree to be shaken, the turntable 2 is rotated by means of fluid motors 6 and the boom 22 is lowered or elevated by means of fluid motor 24 to bring the tube 50 into proximity with a limb to be shaken. The shaker head assembly 49 is then adjusted to conform with the angle of inclination of the limb to be shaken, by moving the hollow arm 58 in either a vertical plane by means of cable 90a and fluid motor 90, in a horizontal plane by means of cables 93a and 94a and fluid motors 93 and 94, or tilting the shaker head assembly 49 by means of cables 88a and 91a and fluid motors 88 and 91. The cable 89a is then retracted by fluid motor 89, thereby closing the clasping unit 78 around the limb to be shaken. After the shaker head is so positioned the drawbar 63 is reciprocated by the engine 34 through cable 48, thereby imparting a shaking motion to the limb through the shaker assembly 49. The nuts shaken from the tree are then either collected in a collecting unit encircling the trunk of the tree or are removed from the ground by a nut harvesting machine.

While we have shown and described the preferred embodiment of our invention, we wish it to be understood that we do not confine ourselves to the precise details of construction herein set forth by way of illustration, as it is apparent that many changes and variations may be made therein, by those skilled in the art, without departing from the spirit of the invention or exceeding the scope of the appended claims.

We claim:

1. A tree-shaking machine comprising a base, a turntable rotatably mounted on the base, means connected between the base and the turntable for oscillating the turntable, a boom pivotally mounted on the turntable, means operatively connected between the turntable and the boom for raising and lowering the boom, a tube carried by the boom, said tube having its longitudinal axis parallel with the longitudinal axis of the boom, a hollow arm, a universal joint interposed between the arm and the tube for pivotally supporting the hollow arm on the tube, a drawbar slidably mounted within the arm, means for reciprocating the drawbar operatively connected to one end thereof, a shaker head assembly carried by the hollow arm, a second universal joint connecting the end of the drawbar opposite the reciprocating means to said shaker head assembly, means connected between the tube and the arm for pivoting the arm in a vertical plane, means connected between the tube and the arm for oscillating the arm in a horizontal plane, and means connected between the tube and the shaker head assembly for tilting said shaker head assembly about the longitudinal axis of the hollow arm.

2. A tree-shaking machine according to claim 1, wherein a pair of wheels are resiliently mounted on one end of the base, and a trailer hitch is provided on the opposite end of the base, whereby the machine is adapted to be towed to and from its operative position with respect to a tree, during the nut-harvesting operation.

3. A tree-shaking machine according to claim 1, wherein a side frame of a vehicle is connected to the inboard side of the base, and brace means secured to the outboard side of the base for supporting the base on the side of the vehicle.

4. A tree-shaking machine according to claim 1, wherein the means for reciprocating the drawbar comprises a cable having one end connected to an end of the drawbar, a pair of crank arms rotatably mounted in the boom, a wrist-pin connected between the crank arms, and a collar journaled on the wrist-pin, the opposite end of the cable being reeved through the first mentioned universal joint and tube and secured to the collar, whereby rotary motion imparted to the crank arms is translated into reciprocatory motion through the cable to the drawbar.

5. A tree-shaking machine according to claim 1, wherein the means for pivoting the hollow arm in a vertical plane, and for oscillating said arm in a horizontal plane comprises a plurality of fluid motors mounted on the boom, and a plurality of cables connected between the fluid motors and the hollow arm.

6. A tree-shaking machine according to claim 1, wherein the means for tilting the shaker head assembly about the longitudinal axis of the hollow arm comprises a plurality of fluid motors mounted on the boom, and a plurality of cables connected between the fluid motors and the shaker head assembly.

7. A tree-shaking machine according to claim 1, wherein the shaker head assembly comprises a transverse arm a pair of parallel arms interconnected by said transverse arm, a rubber-coated shaker head pivotally mounted on the parallel arms, a frame member secured to the transverse arm, a rubber-coated clasping unit mounted on the frame member adapted to clasp a limb of the tree to be shaken, said clasping unit comprising a pair of apposed, overlapping, pivotally connected semi-circular members, spring means connected between each semi-circular member and the transverse arm for biasing the semi-circular members into an open position, and means operatively connected to the semi-circular members for moving said members into closed, limb-encircling position.

8. A tree-shaking machine according to claim 7, wherein the means for closing the clasping unit around the limb of a tree comprises a fluid motor mounted on the boom, and a cable connected between the fluid motor and the clasping unit.

References Cited in the file of this patent

UNITED STATES PATENTS

| | | |
|---|---|---|
| 1,472,262 | Abildgaard | Oct. 30, 1923 |
| 2,159,311 | Berger | May 23, 1939 |
| 2,690,639 | Goodwin | Oct. 5, 1954 |